K. VÖLLER.
RUNNING OUT TELESCOPIC SPRINGS OF GUNS WITH RECOILING BARRELS.
APPLICATION FILED AUG. 25, 1914.
1,215,438. Patented Feb. 13, 1917.
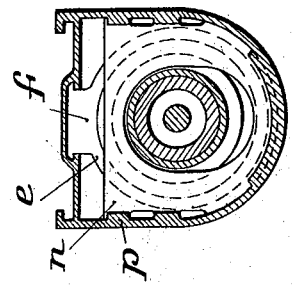
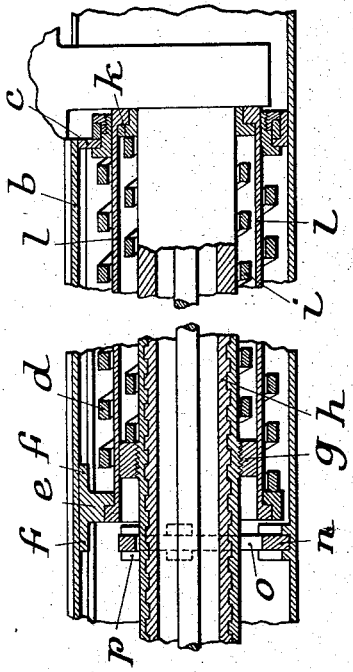
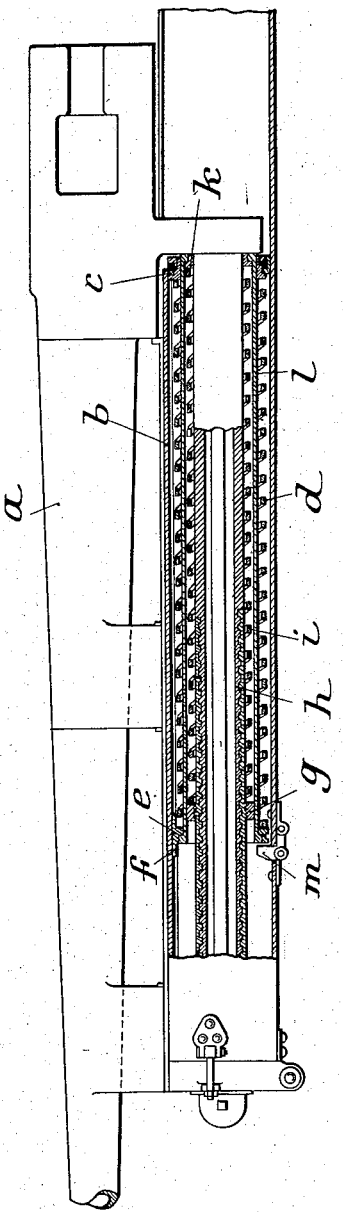
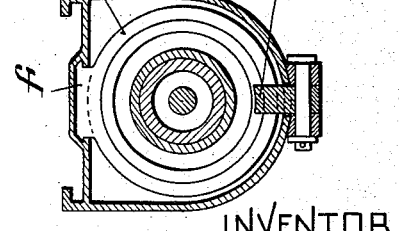
WITNESSES
E. J. Marshall
Arthur C. Proley.
INVENTOR
Karl Völler

UNITED STATES PATENT OFFICE.

KARL VÖLLER, OF DUSSELDORF, GERMANY.

RUNNING OUT TELESCOPIC SPRINGS OF GUNS WITH RECOILING BARRELS.

1,215,438.  Specification of Letters Patent.  Patented Feb. 13, 1917.

Application filed August 25, 1914. Serial No. 858,472.

*To all whom it may concern:*

Be it known that I, KARL VÖLLER, a subject of the German Emperor, residing at 12 Scharnhorststrasse, Dusseldorf, Germany, have invented certain new and useful Improvements in Connection with Running out Telescopic Springs of Guns with Recoiling Barrels; and I do hereby declare the following to be a full, clear, and exact description of the invention, such as will enable others skilled in the art to which it appertains to make and use the same.

In guns with recoiling barrels, in which the running out gear comprises concentric telescopically arranged springs, if the inner spring breaks, the movable bearing plate of the outer spring may be displaced so far as to interfere with the proper working of the gun on firing, and also may cause injury to the parts. The invention consists in a device for preventing such a displacement of the bearing plate of the outer spring if the inner spring breaks. This is attained by fixing, within the cradle and in front of the movable bearing plate of the outer spring, a stop which prevents this plate from being displaced beyond its normal position.

In the accompanying drawings, two constructions according to the invention are shown; Figures 1 and 3 being longitudinal sections and Figs. 2 and 4 cross-sections of these constructions.

In the arrangement according to Figs. 1 and 2, $a$ is the gun barrel which on firing recoils in the cradle $b$. $c$ is a shoulder fixed to the cradle, for the outer running out spring $d$, the movable bearing plate of which is formed by an annular disk $e$. The disk $e$ is guided in the cradle $b$ by means of lugs $f$; $g$ is a bearing ring, fixed to the brake cylinder $h$, for the inner telescoping spring $i$, the rear abutment $k$ of which engages with the shoulder at the end of the tube $l$ which separates the two telescoping springs.

In the event of breakage of the inner running out spring, the outer spring would displace the bearing $e$ together with the tube $l$ in such a manner that the rear bearing $k$ would pass out of the fixed bearing $c$. If this occurs the end coil of the outer spring would extend in front of the spring tube so that the latter would not be able to take part in the recoil on discharge, and the recoil would be of only half so great an extent as it should be. In consequence of this the brake and the carriage would be subjected to considerably greater strain, this naturally tending easily to injure the parts.

In order to prevent this, a fixed stop is arranged, which in the construction shown in Figs. 1 and 2 consists in a locking pawl $m$ pivoted to the cradle, the nose of the pawl projecting into the cradle, so as to prevent any forward movement of the disk $e$ and tube $l$ beyond the original position.

The pawl can be removed from its locking position by turning it on its pivot, so as to allow of the removal and insertion of the springs.

In the construction shown in Figs. 3 and 4, the forward movement of the bearing plate $e$ is limited by a disk $n$. This disk is, as seen from Figs. 3 and 4, provided with a longitudinal slot $o$ and has on its sides projections which in the position shown in Fig. 4 engage between lugs $p$ on the cradle. In order to insert or remove the springs, after the cradle has been opened the disk $n$ is lifted so that its lateral projections are freed from the lugs $p$ of the cradle and the disk can be withdrawn.

I claim as my invention:

1. In combination with a gun having a recoiling barrel, and a cradle therefor, running-out gear for said barrel located in said cradle and comprising telescoping springs, the outer ends of said springs being spaced from the outer end of said cradle, a movable bearing plate for one of said springs, and a stop in the path of said movable bearing plate to prevent displacement of said plate beyond its normal position.

2. In combination with a gun having a recoiling barrel, and a cradle therefor, running-out gear for said barrel located in said cradle and comprising telescoping springs, the outer ends of said springs being spaced from the outer end of said cradle, a movable bearing plate for one of said springs, and a stop projecting into the path of said plate to prevent accidental displacement thereof, said stop being capable of being moved out of the path of said bearing plate to provide access to said springs.

3. In combination with a gun having a recoiling barrel, and a cradle therefor, running-out gear for said barrel located in said cradle and comprising telescoping springs, the outer ends of said springs being spaced from the outer end of said cradle, a movable bearing plate for one of said springs, and a pivoted stop normally in the path of said bearing plate for preventing displacement of the latter beyond its normal position.

4. In combination with a gun having a recoiling barrel, and a cradle therefor, running-out gear for said barrel located in said cradle and comprising telescoping springs, the outer ends of said springs being spaced from the outer end of said cradle, a movable bearing plate for one of said springs, and a pawl mounted on said cradle and projecting into the path of said bearing plate for preventing displacement of the latter beyond its normal position, said pawl being capable of being withdrawn from said cradle.

In testimony whereof, I have signed this specification in the presence of two subscribing witnesses.

KARL VÖLLER.

Witnesses:
ARMIN MEHNERT,
LOUIS VANDORY.

Copies of this patent may be obtained for five cents each, by addressing the "Commissioner of Patents, Washington, D. C."